United States Patent [19]
Goeden et al.

[11] Patent Number: 5,121,958
[45] Date of Patent: Jun. 16, 1992

[54] CARGO FREIGHT PARTITION

[76] Inventors: Mark J. Goeden; Linda M. Goeden, both of 1525 Charles Ave., Worland, Wyo. 82401

[21] Appl. No.: 716,503

[22] Filed: Jun. 17, 1991

[51] Int. Cl.⁵ .............................................. B60R 7/02
[52] U.S. Cl. .................... 296/37.1; 296/24.1; 296/37.16; 410/117
[58] Field of Search ............... 296/37.1, 37.16, 24.1; 410/117, 118

[56] References Cited

U.S. PATENT DOCUMENTS

| | | | |
|---|---|---|---|
| 3,099,313 | 7/1963 | Peck et al. | 410/118 |
| 3,438,673 | 4/1969 | Nelson | 296/37.1 |
| 4,964,771 | 10/1990 | Callihan | 410/118 |
| 5,026,231 | 6/1991 | Moore | 410/117 |

FOREIGN PATENT DOCUMENTS 2196907  5/1986  United Kingdom .

Primary Examiner—Robert R. Song
Attorney, Agent, or Firm—Douglas M. Clarkson

[57] ABSTRACT

A cargo net for a passenger vehicle is described as being formed of a substantially rectangular netting fabric to fit the rear compartment opening of a van, mini-van or the like passenger vehicle with a length of nylon webbing material affixed to its perimeter. A plurality of hook and loop fasteners are used to secure the cargo net to the vehicle structure, which permit separation at selected points around its periphery for access to speciific cargo articles without having to detach the entire cargo net. In one embodiment, two D-rings are described to cooperate with two tension adjusting straps, formed of hook and loop fasteners, to adjust and vary the tension between the cargo net and the articles being restrained.

14 Claims, 2 Drawing Sheets

CARGO FREIGHT PARTITION

BACKGROUND OF THE INVENTION

1. Field of the Invention

The present invention, in general, relates to freight partitions and, more particularly, to freight partitions used to secure cargo within passenger vehicles.

Freight partitions, or "cargo nets" as they are commonly referred to, are in use throughout the world today. Cargo nets are used whenever there is a need to restrain the movement of cargo, i.e., whenever it is wished to have a cargo to remain within a defined area. As such, they are commonly used in airplanes, automobiles, trucks, and passenger vehicles.

While cargo nets for passenger vehicles are considered useful items, they are often difficult to install and remove. In addition, when only one article of cargo is to be retrieved, it is often necessary to detach the entire cargo net from the vehicle first, in order to permit access to any of the articles in the cargo.

Cargo nets for passenger vehicles, are often attached in a manner that does not permit ready adjustment of the tension applied to the restrained articles. To be able to adjust the tension of the cargo net is a desirable feature, in that less tension is required to hold light and fragile articles than is required to hold heavy durable goods.

2. Description of Prior Art

Freight partitions and cargo restraint systems are already known. For example, U.S. Pat. No. 2,170,913 to Rowe, that issued Aug. 29, 1939, describes an anchorage system for railway boxcars.

U.S. Pat. No. 3,224,385 to Elsner, that issued Dec. 21, 1965, describes a cargo control system for railway boxcars and the like heavier carrying vehicles in which dunnage systems are used.

U.S. Pat. No. 3,438,673 to Nelson, that issued Apr. 15, 1969, describes a luggage retainer of tie downs and anchor straps that conform to the various configurations of the walls of automobile luggage compartments.

U.S. Pat. No. 4,262,955 to Duds, that issued Apr. 21, 1981, describes a storage partition that is hidden from view and particularly well suited for use within station wagons.

U.S. Pat. No. 4,671,557 to Lemp, that issued Jun. 9, 1987, describes an interior cover panel useful for keeping the cargo of a hatchback or a station wagon hidden from view.

U.S. Pat. No. 4,773,802 to Rewis, that issued Sep. 27, 1988, describes a freight cover for use in the box of a truck constructed of a panel of flexible material with a rigid bottom strip extendible upwards and detachably secured to the truck box.

While the structural arrangements of the above described devices, at first appearance, have similarities with the present invention, they differ in material respects. These differences, which will be described in more detail hereinafter, are essential for the effective use of the invention and which admit of the advantages that are not available with prior devices.

OBJECTS AND SUMMARY OF THE INVENTION

It is an important object of the present invention to provide a cargo net that is particularly well suited for use in vans, mini-vans, and similar passenger vehicles.

It is also an object of the invention to provide a cargo net that can be installed by the consumer as an aftermarket accessory.

Another object of the invention is to provide a cargo net that can be factory installed.

Still another object of the invention is to provide a cargo net that permits articles to be accessed readily regardless of where, within the area confined by the cargo net, an article is located physically.

Yet another object of the invention is to provide a cargo restraining net of such structure as to permit varying the amount of tension applied on articles being restrained.

Briefly a cargo net that is constructed in accordance with the principles of the present invention embodies a section of netting fabric of a preselected configuration that is reinforced around its perimeter. One part of a hook and loop fastening system is affixed at spaced intervals around the perimeter of the cargo net for attaching and detaching, in whole or in part, the cargo net from the interior of a vehicle. A tension varying arrangement is located between the reinforced perimeter of the netting fabric and the interior of the vehicle.

DETAILED DESCRIPTION OF THE INVENTION

Figure 1:
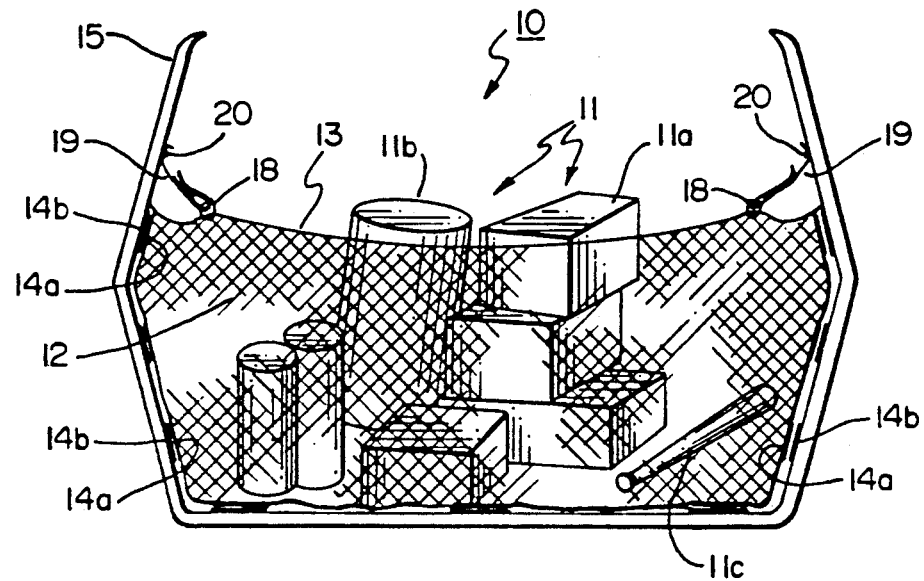
FIG. 1 is a view of a preferred form of a cargo net, constructed and arranged in accordance with the present invention, shown attached to the interior of a vehicle.
Figure 2:
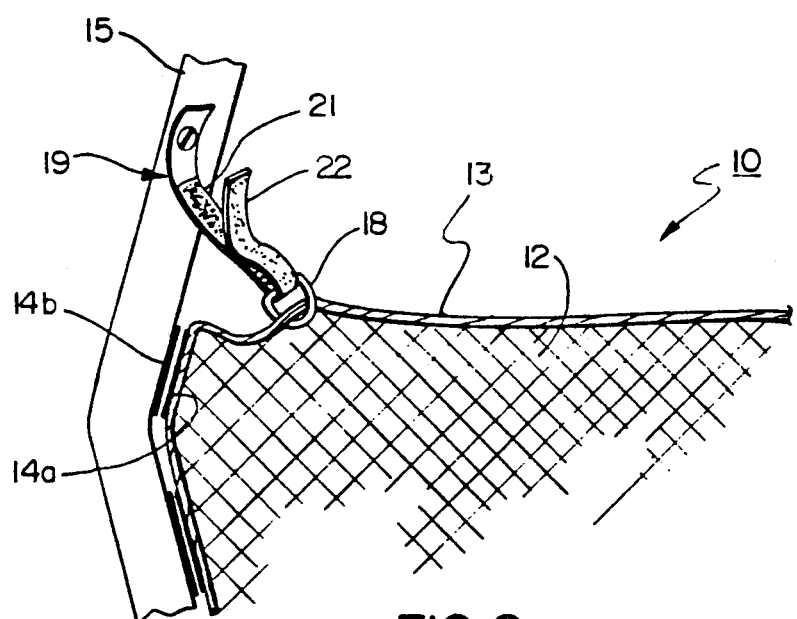
FIG. 2 is a view of a part of the cargo net of the invention to illustrate one feature in more detail as it is attached to the interior of a vehicle.

Referring to FIGS. 1 and 2, a cargo net is identified by the numeral 10. Articles of a cargo are identified generally by the numeral 11. Specific articles are identified as boxes 11a, bags of groceries 11b and even a baseball bat 11c.

A substantially rectangular piece of netting fabric 12 is sized to fit the rear compartment opening of a van, mini-van, passenger vehicle and the like passenger vehicle. The weave diameter and density of weave forming the netting fabric 12 is varied to suit cargo article restraint requirements.

For example, in heavy duty commercial usage, a heavy durable netting fabric 12 material is used. In contrast, for light duty usage, a thin, transparent, flexible sheet of a plastic material is used as the fabric 12.

A presently preferred form of the fabric 12 is a webbing material, with its density of weave varied to suit the cargo articles that are being secured. Small cargo items are held in place better with a denser weave of the netting fabric 12, and bulky cargo articles require a less dense weave.

A length of nylon webbing 13 material is attached to the netting fabric 12 along the full perimeter of the netting fabric 12. The nylon webbing 13 provides increased strength to the netting fabric 12 as well as providing a surface whereby other parts of the invention are affixed, as shall be described hereinafter.

A hook and loop fastening system 14a and 14b secures the cargo net 10 to the vehicle structure 15. Cargo net hook and loop fasteners 14a are affixed at convenient spaced intervals to the nylon webbing material 13. One part 14a, the cargo net fasteners, mates with a corresponding part 14b of the hook and loop fasteners that is attached to the vehicle structure 15.

The cargo net fasteners 14a are located where convenient along the two sides and bottom segments of the nylon webbing 13. The quantity and location of the fastener components are determined by the specific requirements of each installation, in order to achieve both the necessary cargo restraint characteristics as well as to provide easy access to the cargo articles 11.

The vehicle fasteners 14b are attached to the vehicle structure 15 to align properly with corresponding cargo net fasteners 14a in a manner as will be described hereinafter. The vehicle fasteners 14b can be installed by either factory and dealer installation or the end consumer in an after-market installation of the cargo net 10.

The attachment means for affixing the vehicle fasteners 14b to the vehicle structure 15, for both factory and dealer installations, rely primarily upon the use of industrial adhesives. The surface of the vehicle structure 15 is prepared according to the specific instructions supplied by the adhesive manufacturer.

After the surface is prepared, the industrial adhesive is applied to one side of each one of the vehicle fasteners 14b, which is then affixed to the vehicle structure 15 located as shown and in accordance with a supplied template. The location of each vehicle fastener 14b on the template is designed specifically in accordance with the structural configuration requirements of each vehicle, to achieve both the necessary cargo restraint characteristics and to provide easy access to cargo articles 11.

Each of the locations for the vehicle fasteners 14b on the template aligns with one of the cargo net fasteners 14a attached to the nylon webbing material 13 of the cargo net 10 that is manufactured specifically for each particular vehicle. After allowing for a curing time as specified by the industrial adhesive manufacturer, the cargo net fasteners 14a may be attached to the vehicle fasteners 14b and the cargo net 10 installed and thereafter used.

It is equally credible to allow the after-market consumer, as well as the factory or dealer, to attach the vehicle fasteners 14b to the vehicle structure 15 by the use of an industrial adhesive that is supplied with the cargo net 10. Such an industrial adhesive would be included as one component of an after-market kit that is manufactured specifically for each particular model of vehicle.

However, such adhesives that are in any after-market kit for use by an individual installer must, of necessity, be less hazardous to use than those handled by trained professional installers.

Figure 3:
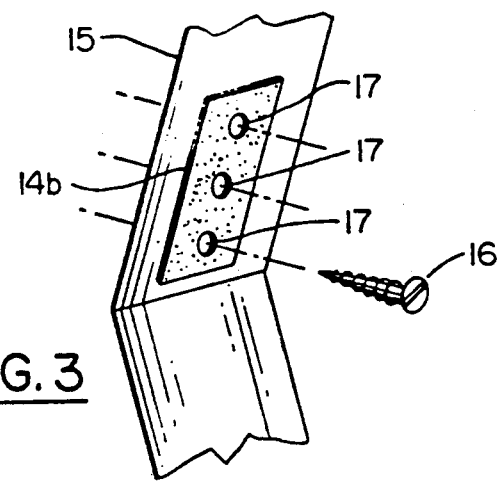
FIG. 3 is a view in perspective of an attachment for the hook and loop fastener system of the invention to the interior of a vehicle.

Referring momentarily to FIG. 3, a sheet metal screw 16 is shown as one example of a variety of mechanical fasteners that are available as an alternate fastener by which after-market installers can attach the vehicle fasteners 14b to the vehicle structure 15.

In a case where sheet metal screws 16 are used, each of the vehicle fasteners 14b would contain a plurality of holes 17 that are reinforced by grommets or washers. Each sheet metal screw 16 would pass through each reinforced hole 17 and into the vehicle structure 15.

A washer (not shown) is useful for distributing more evenly the forces on the vehicle fastener 14b by the screw 16. The screw 16 would be inserted through such a washer before the screw is threaded through the hole 17 and into the vehicle structure 15.

In an alternative embodiment, an adhesive backing is pre-formed on each of the vehicle fasteners 14b which permits it to be applied directly on the vehicle structure 15. A protective covering would be placed by the manufacturer over such an adhesive backed surface, which can be peeled off, and the vehicle fastener 14b is applied safely to the vehicle structure 15 in the proper location by an individual.

A template (not shown) is provided in the individual installer's kit as an aid to properly locate each of the self adhesive vehicle fasteners 14b upon the vehicle structure 15.

Referring again to FIG. 1, an important object of the invention is to facilitate easy access, in general, to any of the cargo articles 11. If only the baseball bat 11c is to be removed from behind the cargo net 10, it is necessary, therefore, to pull the cargo net 10 in an upward direction nearest to the item required.

In this example, the specific hook and loop fasteners of interest are those nearest to the bat 11c. This upwardly pulling action causes the hook and loop fasteners 14a and 14b to separate at that location only, and access to the baseball bat 11c is obtained by reaching underneath the cargo net 10 at that location only.

The detached hook and loop fasteners 14a and 14b are pressed together again, after the baseball bat 11c has been removed, to restore the cargo net 10 back to its original condition. Access to specific cargo articles is achieved without the need to detach the entire cargo net 10 from the vehicle structure 15.

Referring again to both FIGS. 1 and 2, a D-ring 18 is attached near each side of the top surface of the nylon webbing material 13. A tension strap 19 is attached to the vehicle structure 15 by the use of a heavy sheet metal screw 20.

The tension strap 19 is attached, along approximately one-half of its length, to a hook portion 21 of a hook and loop fastening system. The loop portion 22 is attached to the remainder of the tension strap 19.

To adjust the tension of the cargo net 10, the tension strap 19 is inserted through the D-ring 18 and pulled snugly towards the vehicle structure 15. When the desired amount of tension has been applied to the cargo net 10, the loop portion 22 of the tension strap is pressed against the hook portion 21 to secure it firmly in place.

The process is repeated at each side of the top surface of the nylon webbing 13 until the desired amount of tension is achieved in the cargo net 10. To loosen the cargo net 10, the hook and loop portions of the tension strap 19 are separated, and the tension in the strap 19 is adjusted, before the hook and loop portions are pressed together again.

Figure 4:
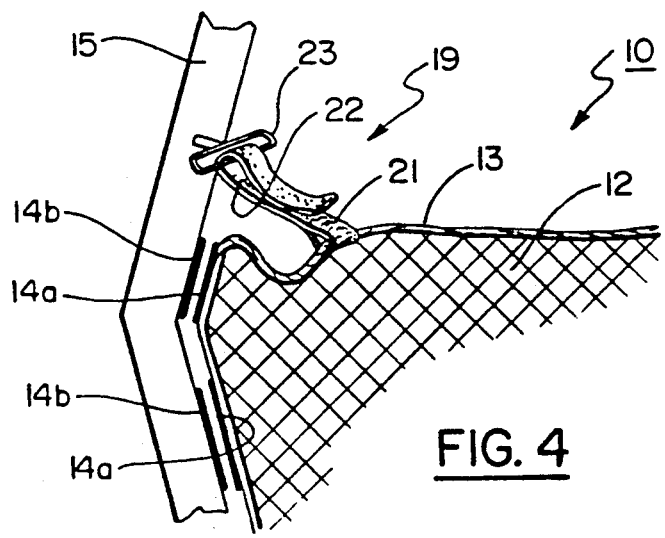
FIG. 4 is a perspective view of an attachment to vary the tension applied by the cargo net to restrain a cargo.

Referring now to FIG. 4, an alternative adjustment for the tension in the cargo net 10 is illustrated. In this arrangement, the tension strap 19 is attached by stitching to the nylon webbing 13 and inserted through a D-ring screw 23 that is secured to the vehicle structure 15 and is pulled snugly back towards the cargo net 10.

When the desired amount of tension is obtained, the hook and loop portions are pressed together. To loosen the cargo net 10, the end of the tension strap 19 is pulled to separate the hook and loop portions, and the tension strap 19 may be removed from the D-ring screw 23 or the tension may be adjusted, the hook and loop portions being pressed together again firmly.

Figure 5:
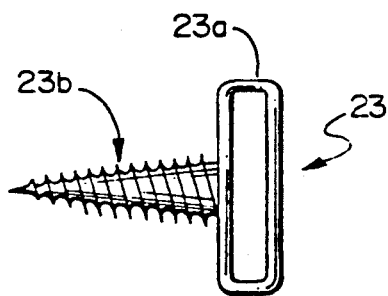
FIG. 5 is a view of a preferred form of an attachment for threading into the interior of a vehicle.

Details of construction for the one piece D-ring screw 23 is shown in FIG. 5. The one piece D-ring screw 23 contains a substantially rectangular loop 23a formed integrally with the threaded end of a shaft 23b.

Figure 6:
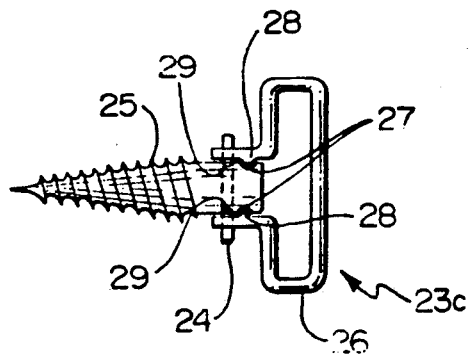
FIG. 6 is a view of an alternative arrangement for the attachment to the interior of a vehicle.

A three piece D-ring screw 23c is shown in FIG. 6. A pin 24 passes through a threaded shaft 25 and through each end of a ring 26. The ring 26 is pivotable on the pin 24.

When not in use, the ring 26 pivots to hang flat against the vehicle structure 15, so that it is out of harms way. When the tension strap 19 is inserted through the ring 26 and pulled, the ring 26 will pivot about the pin 24 into alignment toward the cargo net 10.

To lessen vibration and noise, extended position recesses 27 and retracted position recesses 29 are formed in the screw shaft 25 to cooperate with protrusions 28 formed as an integral part of the ring 26. By this arrangement, the ring 26 does not flap about during operation of the vehicle without the cargo net 10 in use.

When the ring 26 is pivoted into a flush position against the side of the vehicle structure 15, the protrusions 28 engage the retracted position recesses 29 to secure the ring 26 in its retracted position, thus avoiding vibrating and the damage that it can cause. Similarly, when the ring 26 is extended towards the cargo net 10, the protrusions 28 engage the extended position recesses 27 and reduce vibration and noise.

The invention has been shown, described and illustrated in substantial detail with reference to the presently preferred embodiments. It will be understood by those skilled in this art that other and further changes and modifications may be make without departing from the spirit and scope of the invention which is defined by the claims appended hereto.

What is claimed is:

1. A cargo net for restraining articles within a passenger vehicle, comprising:
   netting fabric means to be disposed in a substantially vertical plane and formed of a predetermined size and shape to fit an area within a passenger vehicle;
   nylon webbing means attached to said netting fabric means around substantially its periphery; preselected parts of hook and loop fasteners attached to said nylon webbing means at predetermined spaced apart locations along the sides and bottom and corresponding parts of the hook and loop fasteners attached to corresponding portions of the vehicle; and
   tension adjusting means attached between said nylon webbing means and said passenger vehicle.

2. A cargo net as defined by claim 1 wherein said hook and loop fasteners are attached to said nylon webbing means by stitching.

3. A cargo net as defined by claim 1 wherein said hook and loop fasteners are attached to said nylon webbing means by adhesive means.

4. A cargo net as defined by claim 1 wherein said preselected part of said hook and loop fasteners is affixed to said passenger vehicle by adhesive means.

5. A cargo net as defined by claim 1 wherein said preselected part of said hook and loop fasteners is affixed to said passenger vehicle by mechanical means.

6. A cargo net as defined by claim 5 wherein said mechanical means includes threaded screw means.

7. A cargo net as defined by claim 1 wherein said tension adjusting means includes ring means affixed to said passenger vehicle for cooperation with strap means attached to said nylon webbing means.

8. A cargo net as defined by claim 7 wherein said ring means is in the form of a D-ring means affixed to said passenger vehicle.

9. A cargo net as defined by claim 7 wherein said strap means includes hook and loop fastening means at spaced apart locations along its length.

10. A cargo net for restraining articles within a passenger vehicle, comprising:
    flexible sheet means to be disposed in a substantially vertical plane and formed of a preselected transparent material and of a preselected shape to fit an area having sides and a bottom within said passenger vehicle;
    reinforcing means attached to said flexible sheet means around at least predetermined portions of said preselected shape;
    preselected parts of said hook and loop fastener means attached to said reinforcing means at predetermined spaced apart locations along the sides and bottom portion of said flexible sheet means and the corresponding parts of said hook and loop fastener means to be attached to corresponding portions of said sides and bottom of said area within said passenger vehicle for removably attaching said flexible sheet means;
    first means affixed to said passenger vehicle at a preselected height defining an upper limit of said area within said passenger vehicle; and
    second means affixed to said flexible sheet means at a predetermined part of said shape for supporting said sheet means in said area when attached to said first means.

11. A cargo net as defined by claim 10 wherein said preselected transparent material forming said flexible sheet means is a netting material.

12. A cargo net as defined by claim 10 wherein said first means affixed to said passenger vehicle is in the form of a D-ring.

13. A cargo net as defined by claim 10 wherein said second means affixed to said flexible sheet means is a strap formed to act with said first means for supporting said sheet means in said area.

14. A cargo net as defined by claim 10 wherein said first means is in the form of ring means, and said second means includes strap means affixed at one end to said sheet means and having hook and loop fastener means affixed so that with an end opposite said one through said ring means said fastener means supports said sheet means in said area.

* * * * *